United States Patent [19]

Nonnenmacher

[11] 4,149,380
[45] Apr. 17, 1979

[54] CONTROL SYSTEM FOR HYDROSTATIC TRANSMISSIONS

[75] Inventor: Gerhard Nonnenmacher, Korntal, Fed. Rep. of Germany

[73] Assignee: Robert Bosch GmbH, Stuttgart, Fed. Rep. of Germany

[21] Appl. No.: 828,229

[22] Filed: Aug. 26, 1977

[30] Foreign Application Priority Data

Sep. 30, 1976 [DE] Fed. Rep. of Germany ....... 2644128

[51] Int. Cl.² .............................................. F16H 39/46
[52] U.S. Cl. ........................................ 60/445; 60/447; 60/464; 60/494
[58] Field of Search ................. 60/445, 447, 449, 464, 60/465, 494, 488; 417/212

[56] References Cited

U.S. PATENT DOCUMENTS

| | | | |
|---|---|---|---|
| 3,214,911 | 11/1965 | Kempson | 60/464 X |
| 3,650,108 | 3/1972 | Isaac | 60/447 |
| 3,850,272 | 11/1974 | Reinecke et al. | 60/445 X |

*Primary Examiner*—Edgar W. Geoghegan
*Attorney, Agent, or Firm*—Michael J. Striker

[57] ABSTRACT

The control system for a hydraulic transmission comprises a throttle element which consists of a constant throttle and a spring charged adjustable throttle arranged in parallel or, alternatively, comprises a combination of a constant throttle with adjustable throttles. The adjustable throttle has a cross section varying in response to the operating pressure of the hydrostatic transmission. The moment of rotation of a hydrometer included in the transmission is determined by the fluid stream caused by an adjustable pump which is adjusted by a servomechanism controlled by the throttle element and thus forms a transmission control member.

14 Claims, 6 Drawing Figures

CONTROL SYSTEM FOR HYDROSTATIC TRANSMISSIONS

BACKGROUND OF THE INVENTION

Control mechanisms for adjusting the transmission ratio of the hydrostatic transmission by means of a pump and an auxiliary pump driven by a motor are known. It is also known to employ the pressure drop caused by a throttle element arranged in the ducts of the system to use for actuating a signal for varying the transmission ratio.

In these prior art devices the throttle element consists of a regular throttle which is adjustable by the operator's action and which serves to adjust the magnitude of the phase displacement between the increase of the rotation number of the motor and the increase of the pressure in the pressure liquid of the control circuit. The adjustment is effected by the accelerating pedal of the motor. The clear fluid cross section is determined alone by the adjustment made and it determines the time period for the pressure build-up. This has the disadvantage that the throttle must be continuously or repeatedly adjusted in order to obtain an economical and reasonably quiet drive performance.

SUMMARY OF THE INVENTION

These shortcomings are avoided by the control system of the invention which comprises drive means, pump means driven thereby, a fluid-pressure actuated servo mechanism for varying the ratio of the hydrostatic transmission, a first duct for passing the pressure medium from said pump means to said servo mechanism, throttle means provided in said duct, the said throttle means comprising a constant throttle and a second pressure responsive throttle arranged in parallel, the pressure drop caused by said throttle means acting as the actuating signal for controlling the transmission ratio.

The control system of the invention has the advantage that the critical rotation number where the adjustment of the adjustable part in the hydrostatic transmission, be it a pump or motor, sets in, is clearly defined. This is accomplished by the relatively steep fluid pressure increase due to the constant throttle of small flow cross section which predominates in the lower rotation number area.

Besides, an actuation of the adjustable portion is accomplished already in the lower rotation number range which is desirable for efficiency and noise reduction. In doing so, the system does not exceed the maximum rotation torque of the drive motor.

The system has also the advantage that the adjustable part is only slowly actuated in the upper rotation number range.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

Figure 2:
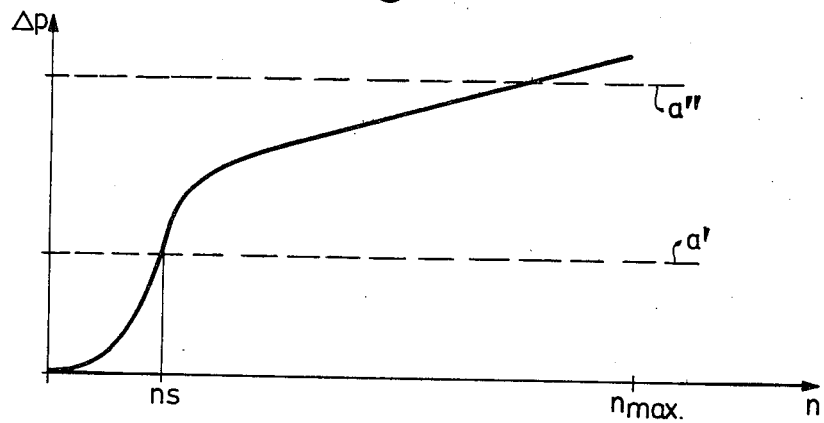

The diagram of FIG. 2 shows the relation of the rotation number of the auxiliary pump in the abscissa to the pressure drop or control pressure exerted upon the throttles (shown in the ordinate).

FIG. 3 is a diagram which again in the abscissa shows the rotation number of the auxiliary pump in relation to the torque $M_D$ in the ordinate and indicates a number of torque characteristic lines.

Figure 4:
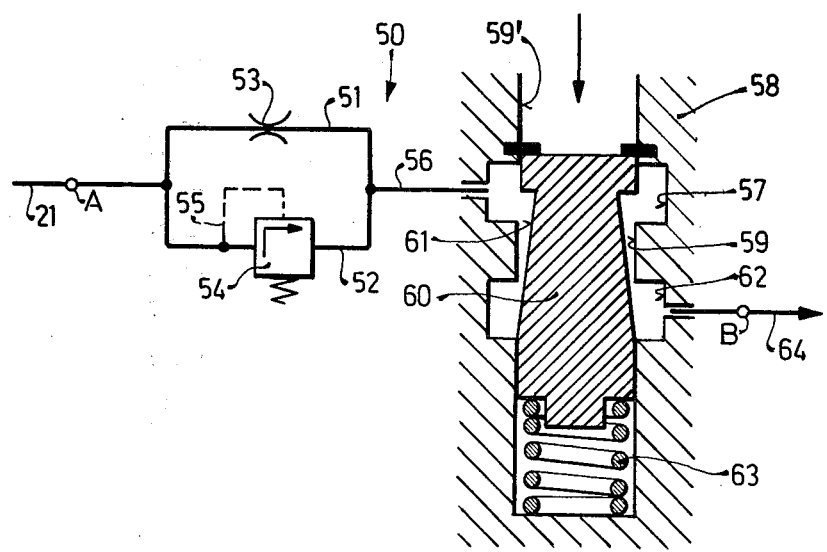

FIG. 4 is a modified version illustrating only the throttle element in diagrammatic form.

Figure 3:
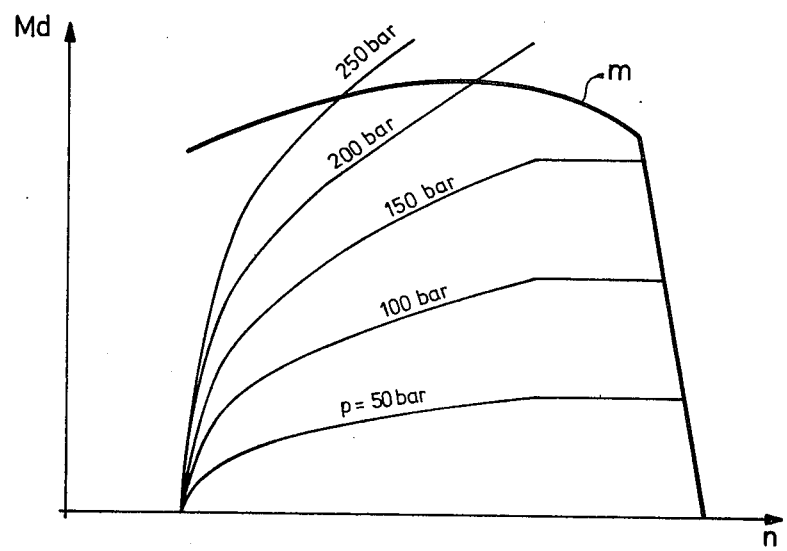
Figure 5:
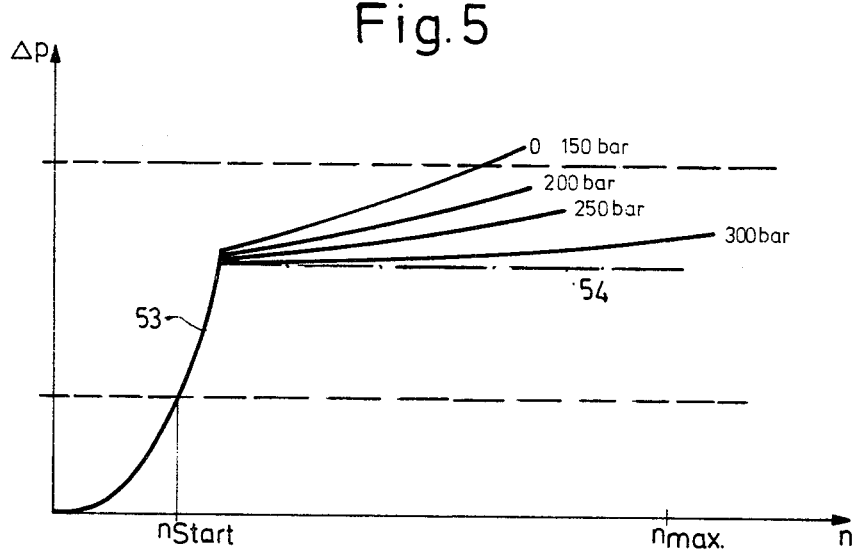
Figure 6:
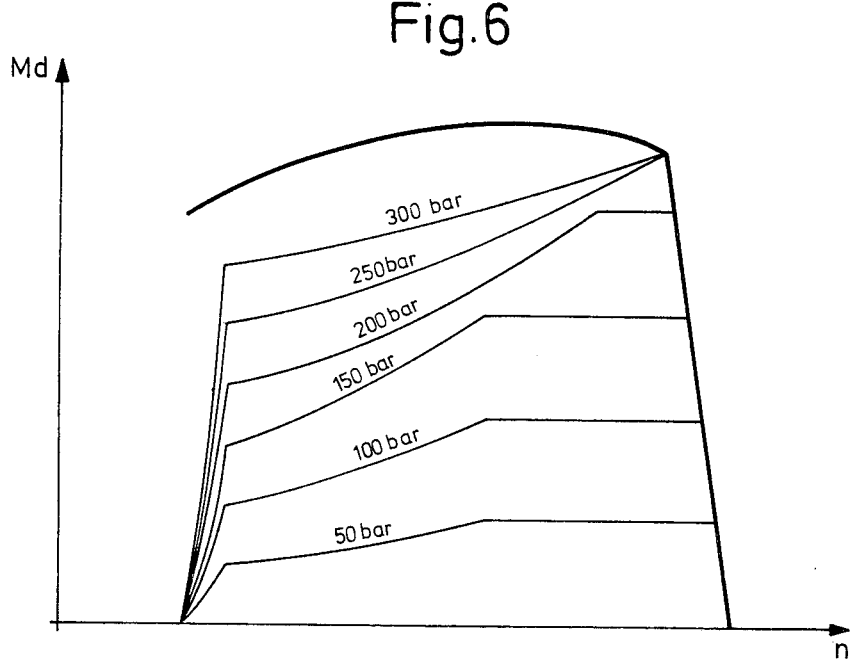

FIGS. 5 and 6 are the same type of diagrams as shown in FIGS. 2 and 3, in this case, however, with reference to the modified version of FIG. 4.

DETAILS OF THE INVENTION AND OF PREFERRED EMBODIMENTS

Figure 1:
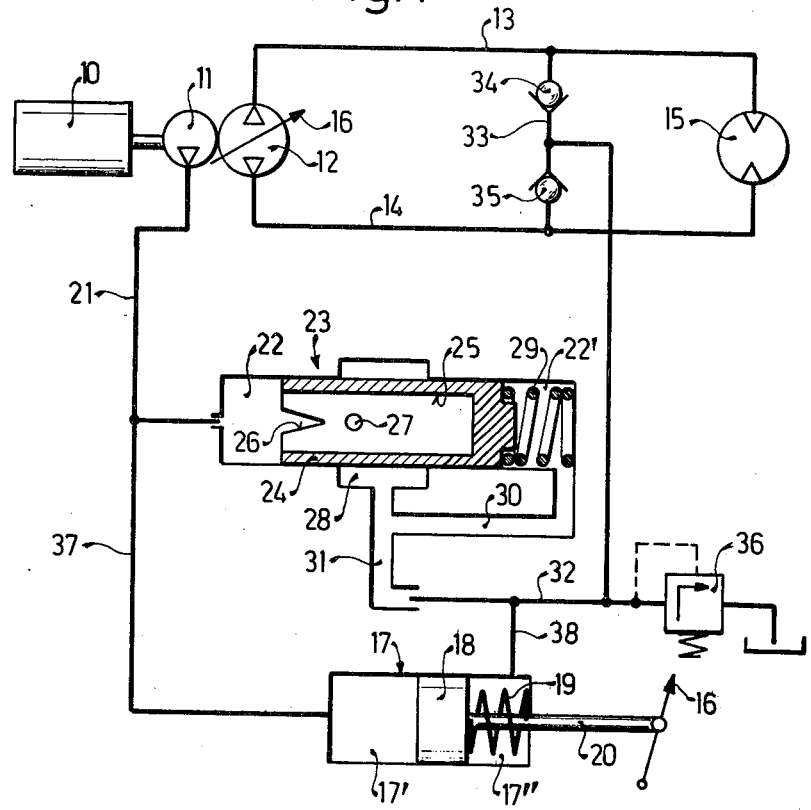
FIG. 1 shows the control system of the invention including the drive motor and the actuated servo mechanism for a hydrostatic transmission regulation, the figure being in schematic manner only.

With reference to FIG. 1 it will be seen that 10 relates to a drive motor, the rotational speed of which is adjustable and which in particular may be a combustion motor. The motor drives an auxiliary pump 11 and an adjustable pump 12 which, through lines 13 and 14, passes the pressure medium in a closed circuit and to and from a hydromotor 15. Numeral 16 indicates the control element of the pump which varies the throw of the displacement elements of the pump and which is controlled by a pressure responsive servomotor 17. The servomotor has a piston 18 which is connected in opposition to a spring 19 by means of a linkage 20 with the control lever or element 16.

The pump 11 is connected by a first inlet duct 21 with the inlet of a bore 22 of the throttle element 23. A control plug or piston 24 moves tightly slidingly in the bore 22. The control plug has about the shape of a beaker, that is, it has a one-sided bore 25. At the front face of the bore a triangular throttle notch 26 is formed which has its base at said front side of the bore.

Downstream from the throttle notch 26 and spaced from it there is provided a throttle bore 27 which penetrates the wall 25 of the plug.

Around the bore 22 an annular channel member 28 is provided which coacts with the throttle bore 27 and the throttle notch 26.

The plug 24 moves in response to the pressure generated by the auxiliary pump 11 and in opposition to the force of a spring 29. The spring is provided in the rearward portion 22' of the bore 22 and a branch channel 30 leads from the annular channel member 28 and the first outlet duct 31 to the rear space 22' in which the spring is housed.

The first outlet duct 31 leads to a second outlet duct 32 which in turn connects with a connecting duct 33 which latter forms part of the closed circuit 13, 14.

Two check valves 34, 35 are provided, respectively, in portion of the duct 33 which connects the two sides 13 and 14 of the closed fluid circuit. The inlet from the second outlet duct 32 into the duct 33 is provided between these two check valves. The check valves open from this inlet point into the two lines 13 and 14 of the closed fluid circuit.

Connected with the second outlet duct 32 is a feed pressure relief valve 36.

Extending from the first inlet duct 21 there is also a second inlet duct 37 which leads into the pressure chamber 17' of the servomotor 17. In the rearward portion 17" of the pressure chamber a third outlet duct 38 forms a connection with the second outlet duct 32.

The metering element for the rotational speed number of the control means for the transmission is formed by the auxiliary pump 11 which moves proportionally to the rotation of the motor 10 and by the throttle element 23. As long as the rotation of the motor 10 is low all of the pressure medium delivered by the auxiliary pump 11 will flow across the constant throttle bore 27. The pressure drop caused by this throttle is then passed to the proportionally responding servomotor 17. The pressure in first outlet duct 31 also has an effect on the fluid pressure in rear chamber 22' of the bore 22. The pressure medium flowing across the throttle bore 27 is passed through the second outlet duct 32 to the connecting duct 33 of the closed circuit and thus via the check valves 34, 35 passes into the low pressure circuit of the hydrostatic transmission.

When the pressure drop in the bore 27 reaches a predetermined value, the control plug 24 will be shifted to the right against the force of the spring 29 to an extent that the throttle notch 26 likewise gets connected with the annular channel 28. Thus, with increasing rotations of the motor 10, the rate of pressure increase becomes flatter.

In this connection reference is made to the diagram of FIG. 2 in which the abscissa shows the rotation number n of the auxiliary pump 11 while the ordinate shows the pressure drop or control pressure at the throttles 26 and 27.

The lower stippled line a' indicates the lower pressure position for the pump 12 while the upper stippled line a'' shows the control pressure for the maximum pump position. As appears at the rotation number $n_s$ there is a steep pressure increase which, after the opening of the throttle 26 flattens out quite strongly. This line is the characteristic of the control pressure.

In FIG. 3 there is again shown on the horizontal line the rotation number of the auxiliary pump, while the vertical line 00 indicates the torsional moment $M_d$. The curved lines are the pressure characteristics of the torsional moment. As this diagram shows the full performance of the engine cannot be made use of at very high pressures.

With reference now to FIG. 4 there is shown a different type of throttle element. The element in general is indicated by the number 50 and is composed of a three-member throttle. The line 21 branches into two lines 51 and 52. In the line 52 a pressure relief valve 54 is provided. The relief valve is actuated by fluid pressure in a duct 55.

The lines 51 and 52 then merge again into a line 56 which leads to an annular channel member 57 of the adjustable throttle 58. The annular channel member 57 is formed as part of the bore 59 in which a control plug 60 moves slidingly. The control plug has a conical area 61 which, depending on the specific position of the plug, constitutes a throttle connection from the annular channel 57 to a second annular channel 62, both of which are formed as part of the bore 59. In the upper portion 59' of the device the operating pressure of the hydrostatic transmission is effective to move the plug 60 counter to the force of the spring 63. The duct 64 which connects with the annular channel 62 leads to the servomotor 17 (not shown in FIG. 4).

The throttle element thus consists of a pressure relief valve 54 which is arranged in parallel with a constant throttle 53 of comparatively narrow cross section. Arranged in series following these two throttle portions there is the third adjustable throttle 58 which has a relatively large fluid cross section.

It will be understood, however, that this third throttle 58 could also be arranged ahead of the constant throttle 53 and the pressure relief valve 54.

The throttle 58 acts in response to the pressure in the hydrostatic transmission in a manner whereby the clear cross section remains constant up to a predetermined pressure valve and when this value is exceeded, starts increasing.

By this kind of device the pressure profile indicated by the characteristics in the diagrams 5 and 6 is obtained. These diagrams show the steep pressure increase caused by the throttle 53 and the relatively flat increase caused by the control plug 60 upon action of the pressure relief valve 54.

It is noted that the following applies to both kinds of embodiments:

The magnitude of the torque or rotation which first causes an adjustment of the pump is clearly and in a definite manner fixed by the relatively steep pressure increase in the lower area of revolutions of the auxiliary pump in which area the constant throttle with its small cross section is active. The adjustment of the pump thus is obtained quickly and it thus acts on the servomotor already in a lower torque area which is desirable for power performance and noise reduction. On the other hand the pump is only slowly adjusted in the upper area of revolutions in order to reach the maximum torque of the drive motor (even in case of a high operating pressure in the hydrostatic transmission) only at a higher torque number. This is accomplished by the action of the adjustable throttle 26 and the pressure relief valve 54, respectively.

The embodiment of FIG. 1 should preferably be arranged to result in a characteristic whereby the torque line at a comparatively high pressure passes through the point of maximum performance of the drive motor.

With the embodiment of FIG. 4 it is possible because of the reduction of the control pressure at a high pressure in the hydrostatic transmission, to cause all characteristics of the torque to reach the maximum performance line of the drive motor, which may be a combustion motor, through the point of maximum performance. Thus, the maximum performance is obtained at all load conditions. The partial load points are then located in reference to the motor characteristics in a manner desirable for the reduction of engine noise and the fuel consumption. There is thereby assured a sufficient distance from the full load line so that the motor can be operated at high revolutions even at a lower performance, for instance, after a cold starting period, etc.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A control system for varying the transmission ratio of a hydrostatic transmission comprising drive means, control pump means driven thereby, a fluid-pressure actuated servo mechanism adapted for varying the ratio of the hydrostatic transmission, duct means for passing the pressure medium from said pump means to said servo mechanism, throttle means provided in said duct, the said throttle means comprising a constant throttle and a variable throttle arranged in parallel with said constant throttle and controlled by a pressure in said duct means, the pressure drop caused by said throttle means acting as an actuating signal for controlling the position of said servo mechanism.

2. The control system of claim 1 wherein the pressure responsive throttle is spring-loaded.

3. The control system of claim 2 wherein the constant throttle has a smaller flow cross section than the spring loaded throttle.

4. The control system of claim 1 wherein the throttle means include a third throttle arranged in series with the two parallel throttles, the third throttle resulting in an added pressure drop actuating said signal.

5. The control system of claim 4 wherein the third throttle is arranged following the two parallel throttles in the direction of flow.

6. The control system of claim 4 wherein the third throttle is adjustable.

7. The control system of claim 4 wherein the third throttle is adjustable in response to the effective pressure in the hydrostatic transmission.

8. The control system of claim 4 wherein the third throttle is associated with a pressure relief valve.

9. The control system of claim 4 wherein the constant throttle has a smaller cross section than both the spring-loaded adjustable throttle and the third throttle.

10. The control system of claim 4 wherein the throttle means comprise a casing, a bore formed therein, a piston sliding therein, exterior channels formed on said casing, a duct forming a fluid communication between said bore and said servo mechanism, a spring acting on one end of said piston, the fluid pressure of the transmission acting on the other end of the piston, and the shape of the piston being irregular so that upon movement of the piston when the hydrostatic pressure in the transmission increases beyond a predetermined value, the channels provided on the casing are cleared by the piston so as to result in an increased flow cross section through said bore.

11. The control system of claim 1 which includes a casing, a bore provided therein, a control plug slidably moving in said bore, an inlet and an outlet portion for said bore, an inlet duct leading from said first duct into said inlet of the bore, an outlet duct for said bore, a generally triangular first throttle notch provided in said plug and having its base directed towards said inlet of the bore, its diminishing cross section pointing in the direction towards said outlet of the bore, a second throttle in the form of a constant diameter bore provided in the wall of said plug downstream from said throttle notch, a peripheral annular channel provided on said bore encircling said plug, the said outlet duct leading from said annular channel to said servo mechanism, a branch channel branching at an intermediate point from said outlet duct and passing into the said bore rearwardly of said control plug, and spring means acting upon the rear of said control plug in response to the fluid pressure generated in said outlet duct and said branch channel.

12. The control system as claimed in claim 11, wherein said transmission includes a fluid pressure actuated hydromotor and an adjustable pump driven by said drive means, said sermomechanism including a sermotor coupled to said adjustable pump, said transmission further including a first set of ducts forming a closed circuit for circulating a pressure fluid between said adjustable pump and said hydromotor, and a second set of ducts for connecting said closed circuit to said servomotor.

13. The control system of claim 12 where an additional branch connects said second set of ducts with said outlet duct of said bore and which additionally includes check valves for said closed fluid circuit operatively connected with said branch.

14. The control system of claim 3 wherein a pressure relief valve is associated with said constant throttle.

* * * * *